United States Patent [19]

Chellis

[11] 4,244,192

[45] Jan. 13, 1981

[54] REFRIGERATION SYSTEM AND RECIPROCATING COMPRESSOR THEREFOR WITH PRESSURE STABILIZING SEAL

[75] Inventor: Fred F. Chellis, Concord, Mass.

[73] Assignee: Helix Technology Corporation, Waltham, Mass.

[21] Appl. No.: 968,325

[22] Filed: Dec. 11, 1978

[51] Int. Cl.³ .............................. F25B 9/00; F16J 9/08; F16J 15/32; F16J 15/48
[52] U.S. Cl. .......................................... 62/6; 277/205
[58] Field of Search ............... 62/6; 277/205; 92/171, 92/165 PR; 417/545

[56] References Cited

U.S. PATENT DOCUMENTS

| | | | |
|---|---|---|---|
| 2,815,970 | 12/1957 | Wallace | 277/205 |
| 2,818,287 | 12/1957 | Josephson | 277/205 |
| 2,979,350 | 4/1961 | Lansky | 277/205 |
| 3,271,038 | 9/1966 | Bastow | 277/205 |
| 3,288,472 | 11/1966 | Watkins | 277/11 |
| 3,396,976 | 8/1968 | Reinhoudt et al. | 277/71 |
| 3,520,542 | 7/1970 | Fruehauf | 277/118 |
| 3,581,499 | 6/1971 | Barosko | 277/205 |
| 3,653,672 | 4/1972 | Felt | 277/205 |
| 3,673,809 | 7/1972 | Bamberg | 62/6 |
| 3,877,239 | 4/1975 | Leo | 62/6 |
| 3,901,517 | 8/1975 | Heathcott | 277/205 |
| 3,960,169 | 6/1976 | Orth et al. | 277/205 |

Primary Examiner—Lloyd L. King
Attorney, Agent, or Firm—Hamilton, Brook, Smith & Reynolds

[57] ABSTRACT

A Stirling refrigeration system includes a compressor having a piston which reciprocates within a cylinder. The piston compresses and expands a working volume of gas to cause sinusoidal variations in gas pressure in a cold finger unit. The mean pressure in the working volume is stabilized, despite gas leakage past the compressor piston seals, by a U-cross-section annular-lip seal in a groove surrounding the piston. A spacer ring within the annular-lip seal and extending beyond the legs of the seal retains the seal away from one of the opposing faces of the groove to insure that the seal consistently tends to permit greater gas leakage in a predetermined direction. With gas leakage in that predetermined direction, the gas pressure reaches a steady condition in which the mean pressure in the working volume of gas is stable relative to the pressure in an hermetically sealed larger crankcase volume of gas on the opposite side of the piston.

5 Claims, 16 Drawing Figures

REFRIGERATION SYSTEM AND RECIPROCATING COMPRESSOR THEREFOR WITH PRESSURE STABILIZING SEAL

BACKGROUND OF THE INVENTION

This invention relates to refrigeration systems and particularly to reciprocating compressors used in such systems.

A Stirling cryogenic refrigeration system includes a reciprocating compressor which provides a sinusoidal variation in pressure in a working volume of gas. The working volume includes the head space above the compressor piston and the internal voids in a refrigerator cold finger. In the case of a split Sterling system, the working volume also includes a gas line interconnecting the above spaces. Within the cold finger, a displacer moves in timed relationship with the sinusoidal pressure variations to provide cooling at one end of the cold finger.

The usual Stirling cycle includes an electric-motor-driven compressor, and the invention will be described with reference to a split Stirling cycle of that type.

One problem encountered in Stirling sysytems is that there is always some leakage past the dynamic seal between the reciprocating compressor piston and its cylinder. The leakage is between the working volume and a control volume on the opposite side of the piston. Where there is a greater leakage in one direction than in the other movement of the piston, the mean value of the pressure in the working volume of gas tends to change relative to the gas pressure of the control volume.

One type seal which might be used in such compressors is a U-cross-section annular seal seated in a groove surrounding the piston. Such a seal advantageously expands with a pressure differential in one direction to thus increase the sealing action of the seal. Unfortunately, the direction of greater leakage past such a seal often changes during the life of the seal such that great fluctuations in the mean value of the sinusoidal pressure curve occur and render the compressor system unreliable.

An object of this invention is to provide a Stirling refrigeration system, and a compressor for use therein, wherein the mean value of the sinusoidal pressure variations in the compressed working volume of gas is stabilized to a predetermined level.

SUMMARY

A piston reciprocates within a cylinder to alternately compress and expand a limited working volume of gas and to cause pressure variations in the gas between minimum and maximum values. An annular-lip seal of generally U-shaped cross-section is positioned in a groove surrounding the piston at the interface of the piston and the cylinder. In accordance with the invention, means is provided for restricting axial movement of the seal. The annular lip of the seal is thereby spaced from the opposing faces of the groove to maintain a single direction of greater gas leakage past the seal. A constant mean pressure in the working volume is thereby maintained.

The legs of the U-cross-section seal extend axially and the seal tends to permit greater leakage of gas in the direction in which the legs of the seal extend. A spacer ring within the U-cross-section seal abuts the seal and extends beyond the legs to retain the seal away from the face of the groove and thereby insure consistency in the direction of greater gas leakage. The compressor thereby reaches a steady condition with either the minimum or maximum value of pressure in the working volume on the opposite side of the piston.

The minimum or maximum value of the gas pressure in the working volume of gas is set by hermetically sealing a larger control volume of pressurized gas at the opposite side of the piston.

Preferably, the legs of the seal point toward the working volume of gas so that there is greater leakage toward that volume. In that way the minimum pressure in the working volume is set at about the pressure of the control volume.

With the piston-driving motor and crank linkage positioned in the larger hermetically sealed volume, and with the greater leakage of gas toward the working volume of gas, the crank is advantageously placed in compression throughout the major portion of its cycle.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
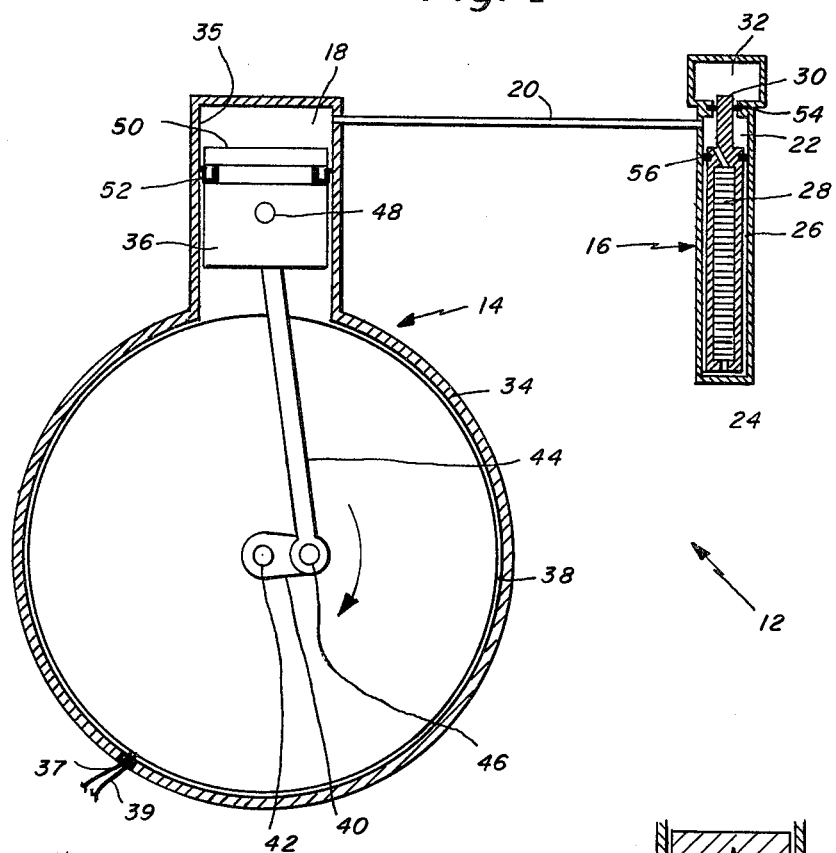
FIG. 1 is a schematic of a split Stirling refrigerator system embodying the present invention.
Figure 2:
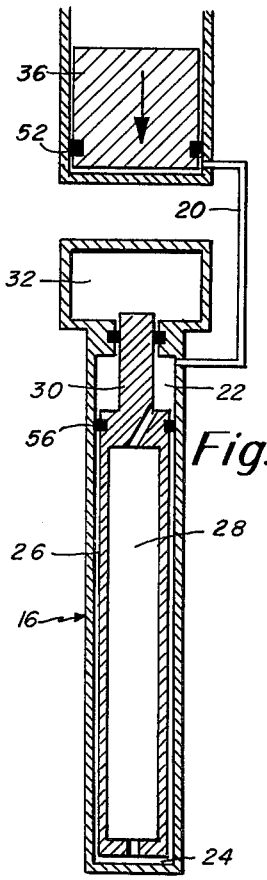
FIGS. 2–5 are simplified schematics of the system of FIG. 1 illustrating four steps in the refrigeration cycle.
Figure 3:
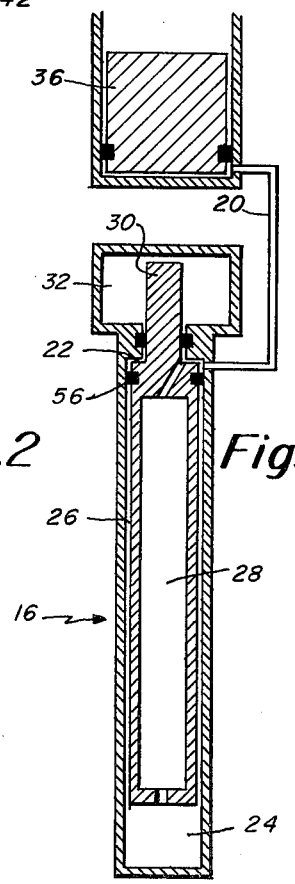

A split Stirling refrigeration system 12 is shown in FIG. 1. This system includes a reciprocating compressor 14 and a cold finger 16. The compressor provides a sinusoidal pressure variation in a pressurized refrigeration gas in the space 18. That pressure variation is transmitted through a helium supply line 20 to the cold finger 16.

Within the cylinder of the cold finger 16 a cylindrical displacer 26 is free to move upwardly and downwardly to change the volumes of the warm space 22 and the cold space 24 within the cold finger. The displacer 26 houses a regenerative heat exchanger 28 comprised of several hundred fine-mesh copper screen discs stacked to form a cylindrical matrix. Other regenerators, such as those with stacked balls, are also known. Helium is free to flow through the regenerator between the warm space 22 and the cold space 24. As will be discussed below, a piston element 30 extends upwardly from the displacer 26 into a gas spring volume 32 at the warm end of the cold finger.

The compressor 14 includes a gas tight housing 34 which encloses a reciprocating piston pump element 36 driven through a crank mechanism from an electrical motor 38. The crank mechanism includes a crank arm 40 fixed to the motor drive shaft 42 and a connecting arm 44 joined by pins 46 and 48 to the crank arm and piston. Electrical power is provided to the motor 38 from electrical leads 39 through a fused ceramic feedthrough connector 37.

The piston 36 has a cap 50 secured thereto. The piston 36 and cap 50 define an annular groove in which a seal ring 52 is seated. The seal ring arrangement, which will be described in detail subsequently, is the key to the present invention.

Heat of compression and heat generated by losses in the motor are rejected to ambient air by thermal conduction through the metal housing 34.

The refrigeration system of FIG. 1 can be seen as including three isolated volumes of pressurized gas. The crankcase housing 34 is hermetically sealed to maintain a control volume of pressuized gas within the crankcase below the piston 36. The piston 36 acts on the control volume as well as on a working volume of gas. The working volume of gas comprises the gas in the space 18 at the upper end of the compressor cylinder 35, the gas in the supply line 20, and the gas in the spaces 22 and 24 and in the regenerator 28 of the cold finger 16. The third volume of gas is the gas spring volume 32 which is sealed from the working volume by a piston seal 54 surrounding the drive piston 30.

Operation of the split Stirling refrigeration system of FIG. 1 can be best understood with reference to FIGS. 2-5. At the point in the cycle shown in FIG. 2, the displacer 26 is at the cold end of the cold finger 16 and the compressor is compressing the gas in the working volume. This compressing movement of the compressor piston 36 causes the pressure $P_w$ in the working volume to rise from a minimum pressure to a maximum pressure. The pressure in the gas spring volume 32 is stabilized at some level between the minimum and maximum pressure levels of the working volume. Thus, at some point the increasing pressure in the working volume creates a sufficient pressure difference across the drive piston 30 to overcome the friction of displacer seal 56 and drive seal 54. The piston and displacer then move rapidly upwardly to the position of FIG. 3. With this movement of the displacer, high-pressure working gas at ambient temperature is forced through the regenerator 28 into the cold space 24. The regenerator absorbs heat from the flowing pressurized gas and reduces that gas to cryogenic temperature.

Figure 4:
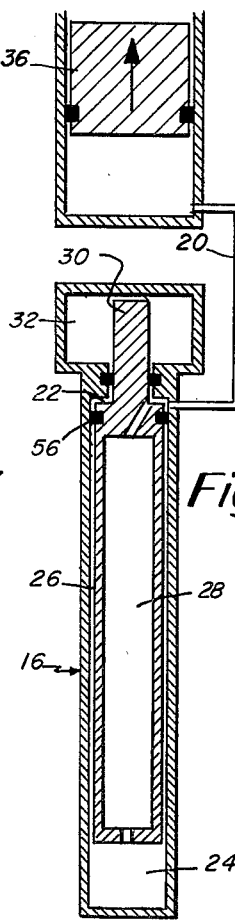
Figure 5:
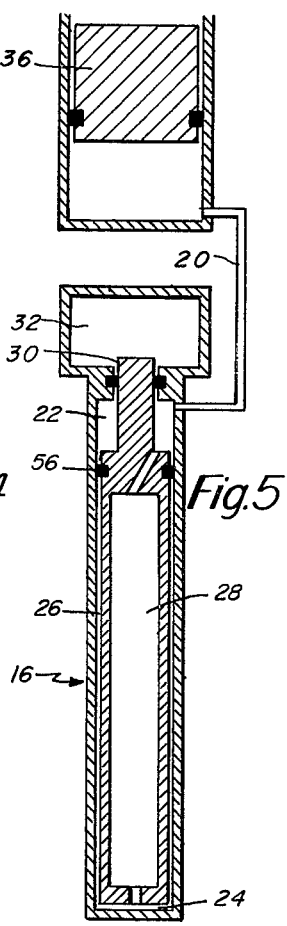

With the sinusoidal drive from the crank shaft mechanism, the compressor piston 36 now begins to expand the working volume as shown in FIG. 4. With expansion, the high pressure helium in the cold space 24 is cooled even further. It is this cooling in the cold space 24 which provides the refrigeration for maintaining a temperature gradient of over 200° K. over the length of the regenerator.

At some point in the expanding movement of the piston 36, th pressure in the working volume drops sufficiently below that in the gas spring volume 32 for the gas pressure differential to overcome seal friction. The piston 30 and the displacer 26 are then driven downwardly to the position of FIG. 5, which is also the starting position of FIG. 2. The cooled gas in the cold space 24 is thus driven through the regenerator to extract heat from the regenerator.

It should be understood that, as is well known in the art, stroke control means may be provided to assure that the displacer does not strike either end of the cold finger cylinder. Such control means may include one way valves and ports suitably located in the drive piston 30.

Figure 6:
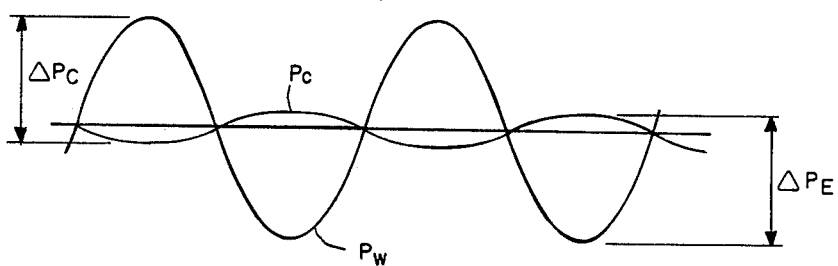
FIG. 6 is a graphical illustration of the working pressure and the control pressure in the refrigeration system of FIG. 1 operating in an ideal mode.

Attention is now directed to operation of the compressor piston seal 52. The respective pressures $P_w$ and $P_c$ in the working volume and control volume follow sinusoidal curves 180° out of phase. Because the control volume is much larger than the working volume, movement of the piston 36 has a lesser effect on pressure in that volume, as illustrated in FIG. 6. At the end of the compression stroke in compressing the working volume, there exists a pressure differential $\Delta P_C$ across the seal 52. At the end of the expansion stroke in expanding the working volume, there exists a pressure differential $\Delta P_E$.

Figure 7:
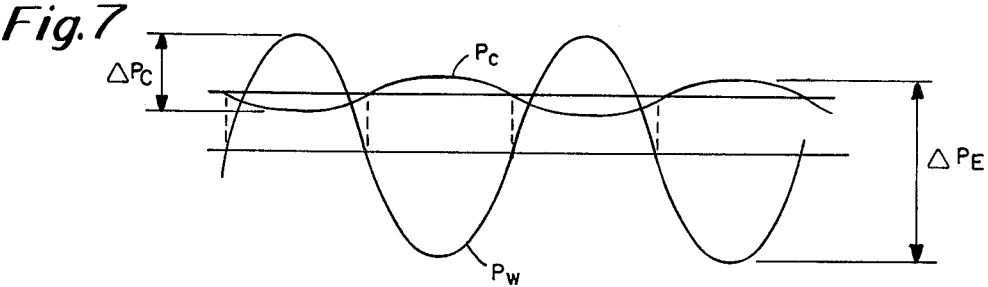
FIG. 7 is a graphical illustration similar to FIG. 6 but with a greater tendency for leakage past the compressor piston into the control volume.

Now consider the situation in which the compressor piston seal 52 tends to have greater leakage in one direction than in another. For example, due to the nature of the seal, a pressure differential $\Delta P_C$ at the compression end of the piston stroke might result in the same leakage as a greater pressure differential $\Delta P_E$ at the expansion end of the stroke. The working pressure and the control pressure tend to stabilize to different mean pressures which equalize the gas leakage. For example, they might stabilize to the condition shown in FIG. 7.

On the other hand, if equal pressure differentials $\Delta P_C$ and $\Delta P_E$ resulted in equal gas leakage in the two directions past seal 52, the system would stabilize to the condition illustrated in FIG. 6. The mean pressures in the control and working volumes would be equal.

Figure 10:
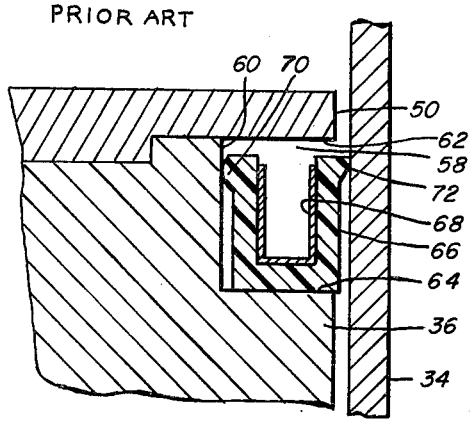
FIGS. 10 and 11 show in cross-section a possible compressor seal for use in the refrigeration system of FIG. 1, but the seal does not give consistent operation of the refigeration system and thus fails to meet the object of this invention.

One seal which tends to provide greater gas leakage in one direction than in the other is the AR10402 sold by Fluorocarbon Company and shown in FIG. 10. As shown in that figure, the piston 36 forms with its cap 50 an annular groove having upper and lower opposing faces 62 and 64. An annular seal 66 having a generally U cross-section is seated within the groove 58. The seal includes a series of outwardly pressing spring members 68 therein. The springs press the respective annular lips 70 and 72 of the seal outwardly against the groove face 60 and against the compressor cylinder wall 34. When the gas pressure is higher above the seal than below the seal, the gas within the U-cross-section seal presses outwardly to increase the sealing action. However, when the pressure is greater below the seal than above, the gas pressure pushes inwardly on the upwardly extending legs of the seal and thereby reduces the sealing action. Thus, the seal shown in FIG. 10 would ordinarily tend to have greater as leakage upwardly past the seal.

Figure 8:
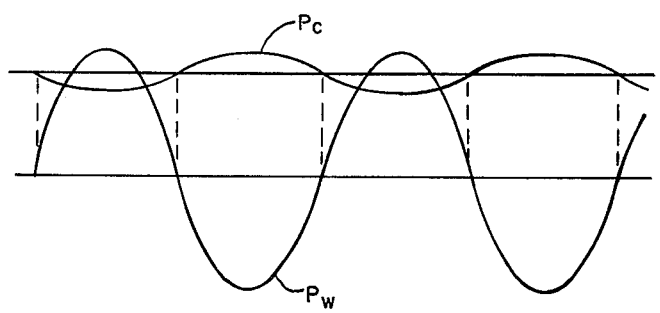
FIG. 8 is a graphical illustration of a system having a greater tendency for leakage into the control volume, as in FIG. 7, but with a lesser pressure differential required for gas leakage.
Figure 9:
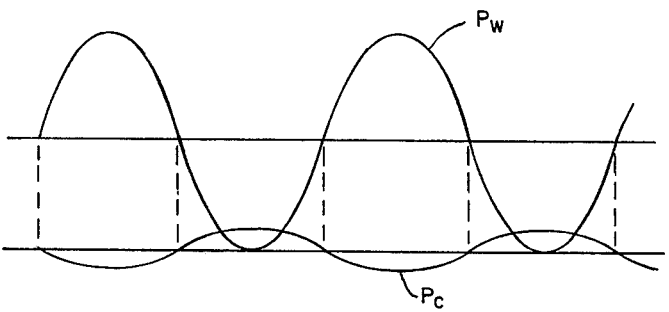
FIG. 9 is a graphical illustration similar to FIGS. 6–8 but for a system in which there is a greater tendency for gas leakage into the working volume, a preferred mode of the present invention.

A refrigeration system as shown in FIG. 1 having a seal arrangement as shown in FIG. 10 could be expected to stabilize at the condition illustrated in either FIG. 8 or FIG. 9. If, for example, the legs of the seal were directed toward the working volume as they are in FIG. 10, there would be a greater tendency for gas leakage from the control volume to the working volume. Thus, the working volume pressure would increase relative to the control volume pressure as shown in FIG. 9. Because the control volume is substantially larger than the working volume, the pressure in the control volume would stay fairly constant. The pressure in the working volume would vary relative to the control volume pressure to a stable condition such as shown in FIG. 9.

As shown in FIG. 9, the minimum working volume pressure would always be slightly less than the maximum control volume pressure. This is because there is always a minimal pressure differential required to cause the leakage from the control volume.

On the other hand, if the seal arrangement of FIG. 10 were inverted such that the legs of the seal 66 extended downwardly toward the control volume, the stable condition illustrated in FIG. 8 could be expected. There would be a greater tendency for gas leakage from the working volume to the control volume. Thus, the working volume pressure would drop relative to the control volume pressure. Only a small pressure differential would exist between the maximum $P_w$ and the minimum $P_c$.

If a refrigeration system could be expected to stabilize in either of the modes shown in FIGS. 8 and 9, the system could be designed to operate in that condition efficiently. For example, if it were known that the maximum pressure of the working volume would always be about equal to the mean pressure of the control volume, the control volume pressure could be set sufficiently high to draw the working pressure to the desired level.

Also, the structural elements within the system could be economically designed to meet the maximum stresses. For example, the connecting rod 44 would have to withstand high compressive forces if the refrigeration system operated in the mode of FIG. 9. On the other hand, high tensile stresses must be met if the system operates in the mode of FIG. 8.

In attempting to use a seal such as shown in FIG. 10, it was found that the seal, when first placed within the system, would operate with near equal leakage in each direction and would thus operate in the condition illustrated in FIG. 6. Soon, however, once the seal was broken in, it would operate as expected with greater gas leakage in the direction of the extending seal legs. It was thought that a system could be designed to operate in a selected one of the modes shown in FIGS. 8 and 9 throughout the expected life of the seal. However, it was found that, after operating for a time in one of the modes of FIGS. 8 and 9, the system would shift to the other mode. The result was a great change in the mean pressure in the working volume. As can be understood with reference to FIGS. 8 and 9, assuming that the pressure of the control volume stays stable, the mean pressure of the working volume might go from about 100 psi less than the control volume pressure to about 100 psi greater than the control volume pressure. This 200 psi differential in working pressures made the refrigeration system totally unreliable.

Figure 11:
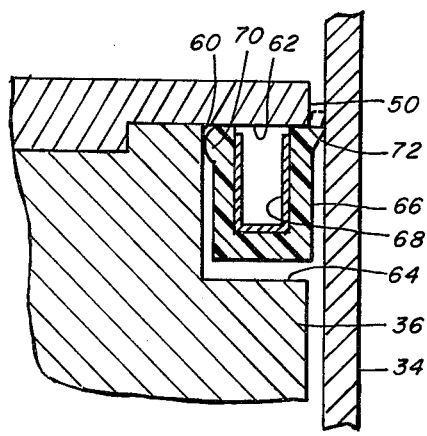

It is believed that this change in operating modes during the life of the system resulted from wear of the seal. As shown in FIGS. 10 and 11, with continued use the seal would move back and forth within the groove between the opposing faces 62 and 64, and might finally become wedged into the space between the piston cap 50 and the cylinder wall 34 (broken line). With the seal thus wedged, the expected upward leakage would no longer result. Based on this assumption, the sealing arrangement of this invention was developed. The arrangement insures that the tendency for greatest gas leakage past the seal is unidirectional throughout the expected life of the refrigeration system.

Figure 12:
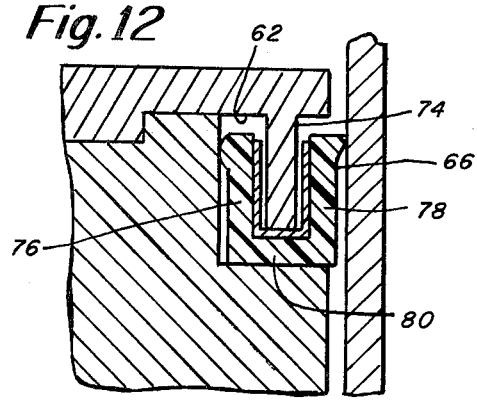
FIG. 12 is a cross sectional view of an improved sealing arrangement in a refrigeration system embodying the present invention.

FIG. 12 shows a sealing arrangement embodying the present invention. A retaining ring 74 extends from the piston cap 50 into the groove 58. The retaining ring 74 has a greater axial width than do the legs 76 and 78 of the seal 66. Thus, by abutting the base 80 of the seal, the retainer ring 74 retains the seal 66 away from the face 62 of the groove. The lip 72 of the seal is thus prevented from wedging between the piston cap 50 and the wall 34 and the seal consistently operates in the selected mode of FIG. 8 or 9. That is, there will always be a greater tendency for gas leakage in the direction that the seal legs extend.

Figure 13:
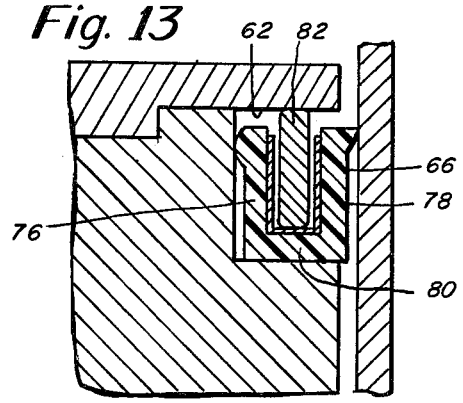
FIG. 13 is a cross sectional view similar to FIG. 12 showing an alternative sealing arrangement.

FIG. 13 shows an alternative embodiment of the sealing arrangement for use in a refrigeration system of the present invention. In that embodiment, the ring 82 is not fixed to the piston cap 50. However, it does have an axial width greater than that of the seal legs and thus holds the seal away from the groove face 62.

Preferably, in either embodiment, the legs of the seal are directed toward the working volume. As a result, there is a greater tendency for leakage toward the working volume and the operating mode of FIG. 9 is attained. In that mode, for a given mean pressure in the working volume, a lesser control pressure need be provided. Also, the crank mechanism operates in compression and the greatest strain is on the wide central portion of the rod 44. In the mode of FIG. 8, the mechanism is in tension and the greatest strain is on the thin circular regions surrounding the pins 46 and 48 at each end of the rod.

Figure 14:
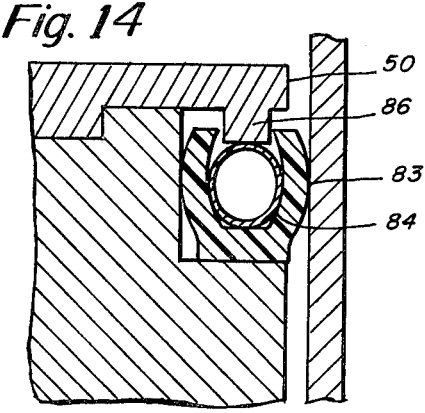
FIGS. 14–16 are cross sectional views similar to FIG. 12 and showing alternative seal arrangements.
Figure 15:
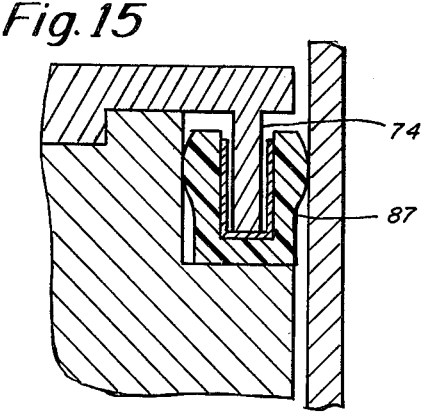
Figure 16:
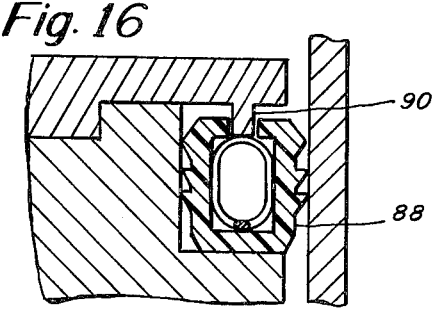

Other seals having generally U-cross-sections which can be used in carrying out the present invention are shown in FIGS. 14, 15 and 16. The seal 83 of FIG. 14 has a spiral spring 84 therein and is sold by the Fluorocarbon Company under the trademark Omniseal, series 103. A retainer ring 86 is shown fixed to the piston cap 50, and it abuts the spiral spring 84 within the seal to limit axial movement of the seal. Wedging of the seal between the piston cap and the cylinder wall is thereby prevented.

The seal 87 shown in FIG. 15 is similar to that described in the preferred embodiment and is also sold by Fluorocarbon Company, under the trademark Omniseal, series 400. It is shown used with a retaining ring 74 fixed to the piston cap but could be used with a descrete retaining ring.

The seal 88 shown in FIG. 16 is sold by Bal Seal Engineering Company under the trademark Bal-Seal. This seal is also biased by a coil spring. It has three lips on each leg rather than the single lip of the other seals. Again, a retaining ring 90 presses downwardly against the coiled spring.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A seal arrangement for the compressor of a refrigerator of the type comprising a reciprocating displacer within a cold finger, the displacer being driven in a reciprocating motion by the pressure differential between a gas in the cold finger and gas in a gas spring volume, the cold finger being in fluid communication with a space in a compressor cylinder, the compressor space and the cold finger defining a closed working volume of gas which is compressed and expanded by a piston in the compressor cylinder, said seal arrangement including an annular-lip seal of generally U-shaped cross section within a circumferential groove at the interface of the piston and cylinder and characterized in that said seal arrangement includes means for restricting axial movement of the seal to retain the annular lip of the seal spaced from the opposing faces of the groove, thereby maintaining a single direction of greater gas leakage past the seal and attaining a substantially constant mean pressure in the working volume.

2. The seal arrangement for the compressor of a refrigerator as claimed in claim 1 wherein the means for retaining the annular lip of the seal axially spaced comprises an annular ring which abuts the seal.

3. The seal arrangement for the compressor of a refrigerator as claimed in claim 1 wherein the direction of greater gas leakage is toward the working volume of gas.

4. A method for compressing and expanding a working volume of gas in a refrigeration system, that method comprising:
providing a reciprocating piston within a cylinder in fluid communication with the working volume;
providing an annular-lip seal of generally U-shaped cross section in a groove surrounding the piston, the seal in normal operation tending to permit greater leakage of gas in a first direction relative to the piston;
limiting axial movement of the annular-lip seal to retain the lip in a position spaced from a face of the groove to insure continued normal operation of the annular-lip seal with the seal continuing to have a tendency for greater gas leakage in th first direction so that the pressure in the working volume of gas assumes a predetermined constant mean pressure value.

5. A method for compressing and expanding a working volume of gas as claimed in claim 4 wherein the first direction is toward the working volume from a control volume.